United States Patent
Shinohara

(10) Patent No.: US 8,285,889 B2
(45) Date of Patent: Oct. 9, 2012

(54) DMA TRANSFER CONTROL DEVICE

(75) Inventor: Naoko Shinohara, Kawasaki (JP)

(73) Assignee: Renesas Electronics Corporation, Kawasaki (JP)

( * ) Notice: Subject to any disclaimer, the term of this patent is extended or adjusted under 35 U.S.C. 154(b) by 84 days.

(21) Appl. No.: 12/789,741

(22) Filed: May 28, 2010

(65) Prior Publication Data

US 2010/0312940 A1 Dec. 9, 2010

(30) Foreign Application Priority Data

Jun. 3, 2009 (JP) .................................. 2009-134126

(51) Int. Cl.
*G06F 13/28* (2006.01)
*G06F 3/00* (2006.01)
*G06F 5/00* (2006.01)

(52) U.S. Cl. ............... 710/22; 710/23; 710/28; 710/40; 710/59; 710/60

(58) Field of Classification Search ............... 710/22, 710/23, 28, 40, 59, 60
See application file for complete search history.

(56) References Cited

U.S. PATENT DOCUMENTS

| 5,752,081 A | * | 5/1998 | Jirgal | 710/22 |
| 6,993,639 B2 | * | 1/2006 | Schlansker et al. | 712/18 |
| 2004/0203968 A1 | * | 10/2004 | Gopalakrishnan et al. | 455/512 |

FOREIGN PATENT DOCUMENTS

| JP | 3202272 B2 | 4/1993 |
| JP | 2005-004563 A | 1/2005 |

* cited by examiner

*Primary Examiner* — Chun-Kuan Lee
*Assistant Examiner* — Farley Abad
(74) *Attorney, Agent, or Firm* — Sughrue Mion, PLLC

(57) ABSTRACT

A DMA transfer control device comprises: a DMA arbiter that performs DMA transfer for each DMA channel formed by a combination of a memory and a plurality of input/output devices and DMA controller circuits that control the DMA arbiter; a judgment unit and a transfer time calculation unit that calculates a next DMA transfer scheduled time based on the DMA transfer size for a DMA transfer request and a judgment time. A timer counter that times the judgment time at a unit time interval, and a comparator that compares the judgment time at which a DMA transfer request arrives with the DMA transfer scheduled time are also provided, and the judgment unit sends the DMA transfer permission to the DMA arbiter when an output of the comparator indicates that the judgment time is not earlier than the DMA transfer scheduled time. The efficiency of data transfer by dynamically controlling DMA transfer is performed.

3 Claims, 4 Drawing Sheets

DMA TRANSFER CONTROL DEVICE

TECHNICAL FIELD

Reference to Related Application

This application is based upon and claims the benefit of the priority of Japanese patent application No. 2009-134126, filed on Jun. 3, 2009, the disclosure of which is incorporated herein in its entirety by reference thereto.

The present invention relates to a DMA transfer control device, and particularly to a DMA transfer control device that dynamically controls DMA transfer.

BACKGROUND

In a computer system, DMA (Direct Memory Access) is generally used in order to transfer data without loading the CPU. Data transfer by DMA is controlled by a DMA transfer control device and performed between memory and an input/output device. When there is a plurality of input/output devices and each of the input/output device requests data transfer, a plurality of DMA transfer control devices is provided. These data transfer paths are called "DMA channels."

When there is a plurality of DMA channels, an arbiter arbitrates between the data transfer requests in order to utilize a system bus to which the memory and the plurality of input/output devices are connected in common. The round-robin method and fixed priority method are used for this arbitration (for instance, refer to Patent Document 1).

However, these arbitration methods are not suitable when one wants to dynamically control the data transfer rate. Meanwhile, there is a method that improves the efficiency of the DMA transfers by measuring the DMA transfer rate and dynamically controlling DMA transfers based on the DMA transfer rate (refer to Patent Document 2).

[Patent Document 1]
Japanese Patent No. JP3202272B
[Patent Document 2]
Japanese Patent Kokai Publication No. JP2005-4563A

SUMMARY

The following analysis is given by the present invention.

In a conventional DMA transfer control device described in Patent Document 2, a DMA transfer rate obtained by dividing the DMA transfer data amount by the DMA transfer time is used, the DMA transfer of a DMA controller having a DMA transfer rate slower than a predetermined value is given the priority, and the DMA transfers of other DMA controllers are restrained. In this method, the DMA transfer rates are averaged in the calculation. In other words, when a large amount of DMA transfers is performed, the transfer rates are averaged even if there are discrepancies therein. This makes it difficult to dynamically control the DMA transfer when the transfer amount temporarily increases, and as a result, the efficiency of the data transfer decreases. Thus there is much to be desired in the art.

According to an aspect of the present invention there is provided a DMA transfer control device comprising: a DMA arbiter that performs DMA transfer for each DMA channel constituted by a combination of a memory and a plurality of input/output devices, and a DMA controller circuit that controls the DMA arbiter, and comprises a judgment unit that sends a DMA transfer permission to the DMA arbiter in a case where a judgment time at which the DMA transfer request arrives from the input/output device is not earlier than a DMA transfer scheduled time, and a transfer time calculation unit that calculates a next round of the DMA transfer scheduled time based on a DMA transfer size for the DMA transfer request and the judgment time.

The meritorious effects of the present invention are summarized as follows.

According to the present invention, the efficiency of data transfer can be improved by dynamically controlling DMA transfer so that a predetermined DMA transfer rate is not exceeded even when the number of DMA transfer requests temporarily increases.

PREFERRED MODES

Figure 1:
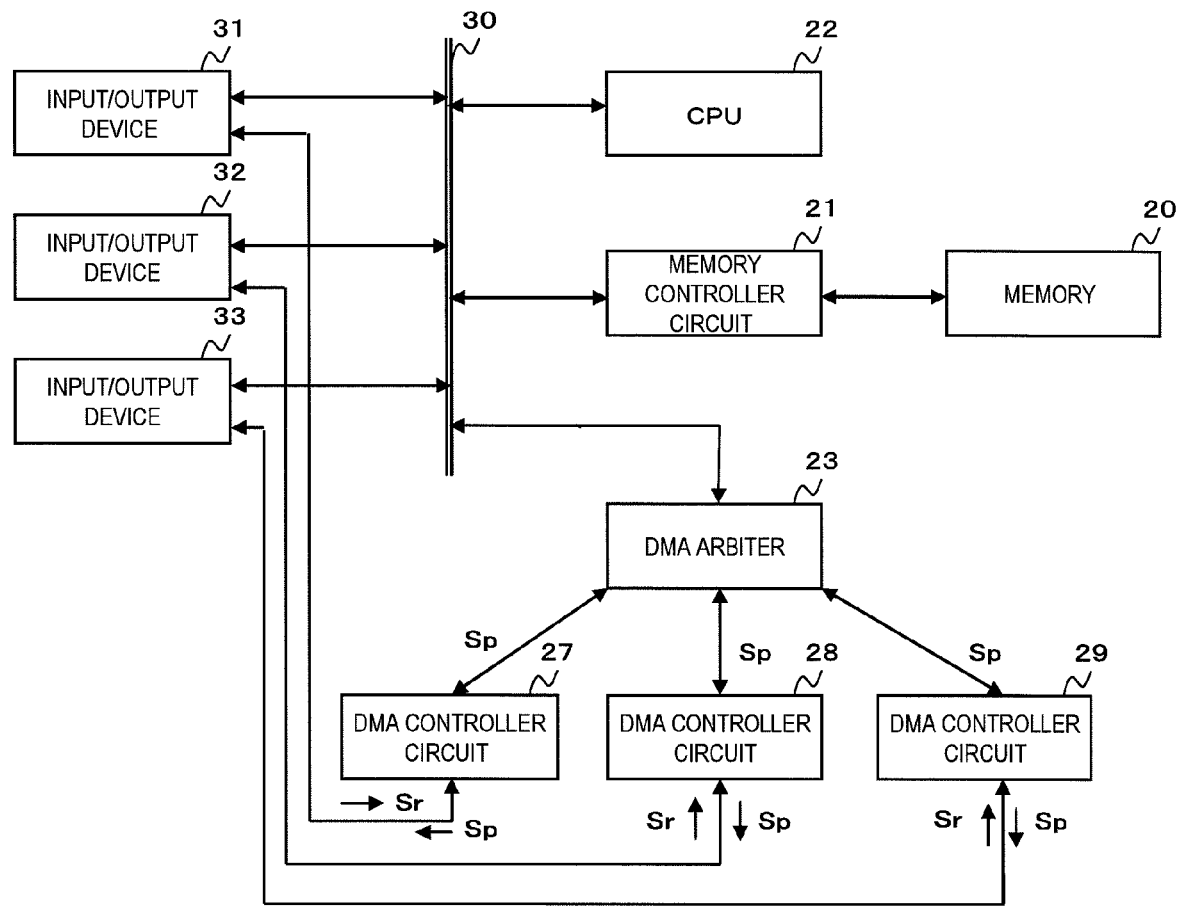
FIG. 1 is a block diagram showing the configuration of a computer system relating to a first example of the present invention.

A DMA transfer control device relating to a mode of the present invention comprises a DMA arbiter (23 in FIG. 1) that performs DMA transfer for each DMA channel constituted by a combination of a memory (20 in FIG. 1) and a plurality of input/output devices (31 to 33 in FIG. 1), and DMA controller circuits (corresponding to 27 to 29 in FIG. 1) that control the DMA arbiter. The DMA transfer control device also comprises a judgment unit (11 in FIG. 2) that sends a DMA transfer permission to the DMA arbiter when the judgment time, i.e. the time at which the DMA transfer request arrives from an input/output device, is not earlier than the DMA transfer scheduled time, and a transfer time calculation unit (12 in FIG. 2) that calculates a next DMA transfer scheduled time based on the DMA transfer size for the DMA transfer request and the judgment time.

The device may be configured so that a timer counter (13 in FIG. 2) that counts the judgment time at a unit time interval and a comparator (10 in FIG. 2) that compares the judgment time at which a DMA transfer request arrives with the DMA transfer scheduled time are provided, the judgment unit sends the DMA transfer permission to the DMA arbiter when an output of the comparator indicates that the judgment time is not earlier than the DMA transfer scheduled time, and the judgment unit does not send the DMA transfer permission to the DMA arbiter when the output of the comparator indicates that the judgment time is earlier than the DMA transfer scheduled time.

The transfer time calculation unit may comprise calculation units (corresponding to 16 and 17 in FIG. 2) that multiply a set value of the DMA transfer size for a DMA transfer request by a set value of a DMA transfer interval for unit DMA transfer size and add the judgment time to the result, and a register (19 in FIG. 2) that holds the result of the calculation performed by the calculation units as a next DMA transfer scheduled time.

The DMA transfer control device described above suspends DMA transfer even when there is a DMA transfer request until the DMA transfer scheduled time corresponding to a peak DMA transfer rate. Therefore, the efficiency of the data transfer of a plurality of DMA channels can be increased as a whole by dynamically controlling the DMA transfer such that the peak DMA transfer rate is not exceeded in each DMA channel.

The present invention will be described in detail using an example with reference to the drawings.

EXAMPLE 1

FIG. 1 is a block diagram showing the configuration of a computer system relating to a first example of the present invention. In FIG. 1, the computer system comprises a memory 20, a memory controller circuit 21, a CPU 22, the DMA arbiter 23, the input/output devices 31 to 33, and the DMA controller circuits 27 to 29. The memory 20, the memory controller circuit 21, the CPU 22, and the DMA arbiter 23 are connected to each other via a system bus 30 constituted by an address bus, a data bus, and a control line. In this example, there are three DMA channels.

The DMA controller circuits 27 to 29 respectively receive DMA transfer request signals Sr from the input/output devices 31 to 33, respectively return DMA transfer permission signals Sp to the input/output devices 31 to 33 as DMA transfer responses, and respectively output the DMA transfer permission signals Sp to the DMA arbiter 23 as the DMA transfer judgment results.

When there is a plurality of DMA transfer permissions in the DMA transfer judgment results received from the DMA controller circuits 27 to 29, the DMA arbiter 23 selects one from them and performs DMA transfer between the memory and the input/output device corresponding to a selected DMA channel.

Figure 2:
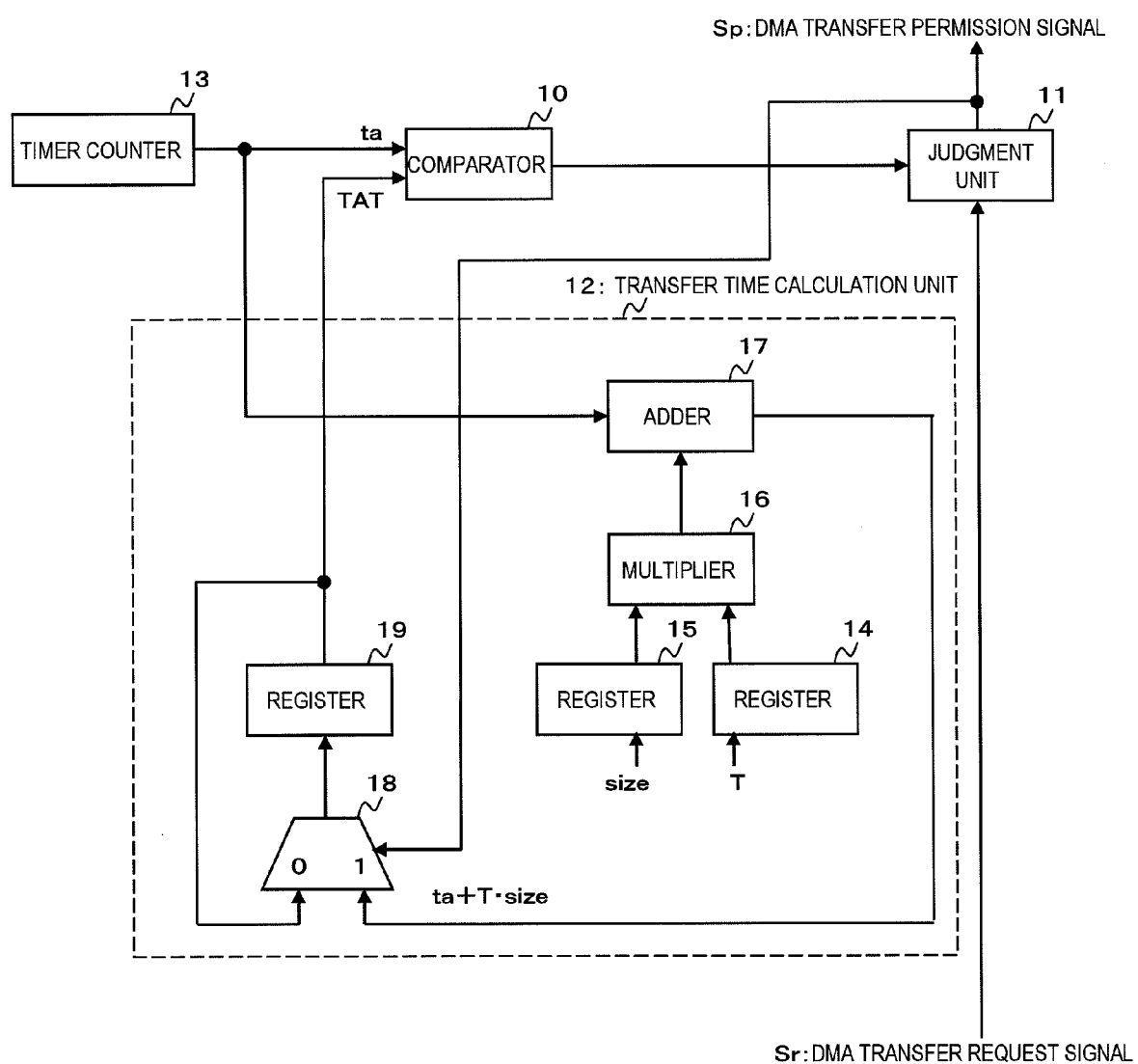
FIG. 2 is a drawing showing the configuration of a DMA controller circuit relating to the first example of the present invention.

FIG. 2 is a drawing showing the configuration of the DMA controller circuit relating to the first example of the present invention. The DMA transfer controller circuits 27 to 29 comprise a comparator 10, a judgment unit 11, a transfer time calculation unit 12 that calculates the DMA transfer scheduled time TAT, and a timer counter 13 that counts the judgment time ta. The comparator 10 compares the judgment time ta at which the DMA transfer request signal Sr is received and the DMA transfer scheduled time TAT. According to the comparison result of the comparator 10, the judgment unit 11 sends the DMA transfer permission signal Sp to the DMA arbiter 23 and one of the input/output devices 31 to 33 (the issuer of the DMA transfer request signal Sr). The transfer time calculation unit 12 calculates the next DMA transfer scheduled time TAT and stores it. The timer counter 13 counts the judgment time ta at a unit time interval.

The transfer time calculation unit 12 comprises registers 14, 15, and 19, a multiplier 16, an adder 17, and a selector 18. The register 14 stores a set value T of the DMA transfer interval per unit DMA transfer size, i.e., the reciprocal of the peak DMA transfer rate. The register 15 stores a set value "size" of the DMA transfer size. The multiplier 16 calculates the peak DMA transfer interval (T·size) by multiplying values extracted from the registers 14 and 15. The adder calculates the next DMA transfer scheduled time (TAT=ta+T·size) by adding the judgment time to from the timer counter 13 and the output of the multiplier 16. The selector 18 selects the next DMA transfer scheduled time TAT outputted from the adder 17 when the judgment unit 11 outputs the DMA transfer permission, and selects the original DMA transfer scheduled time TAT held by the register 19 and outputs it to the register 19 when the judgment unit 11 does not output the DMA transfer permission. The register 19 holds the result of the selector 18.

In the transfer time calculation unit 12, the setting of the DMA transfer size (size) is updated by, for instance, the CPU 22 at each DMA transfer. Further, the DMA transfer interval (T) may be fixed for each DMA channel, and when one wants to change the DMA transfer rate ratio between the DMA channels, the CPU 22 may be used to dynamically control it.

Figure 3:
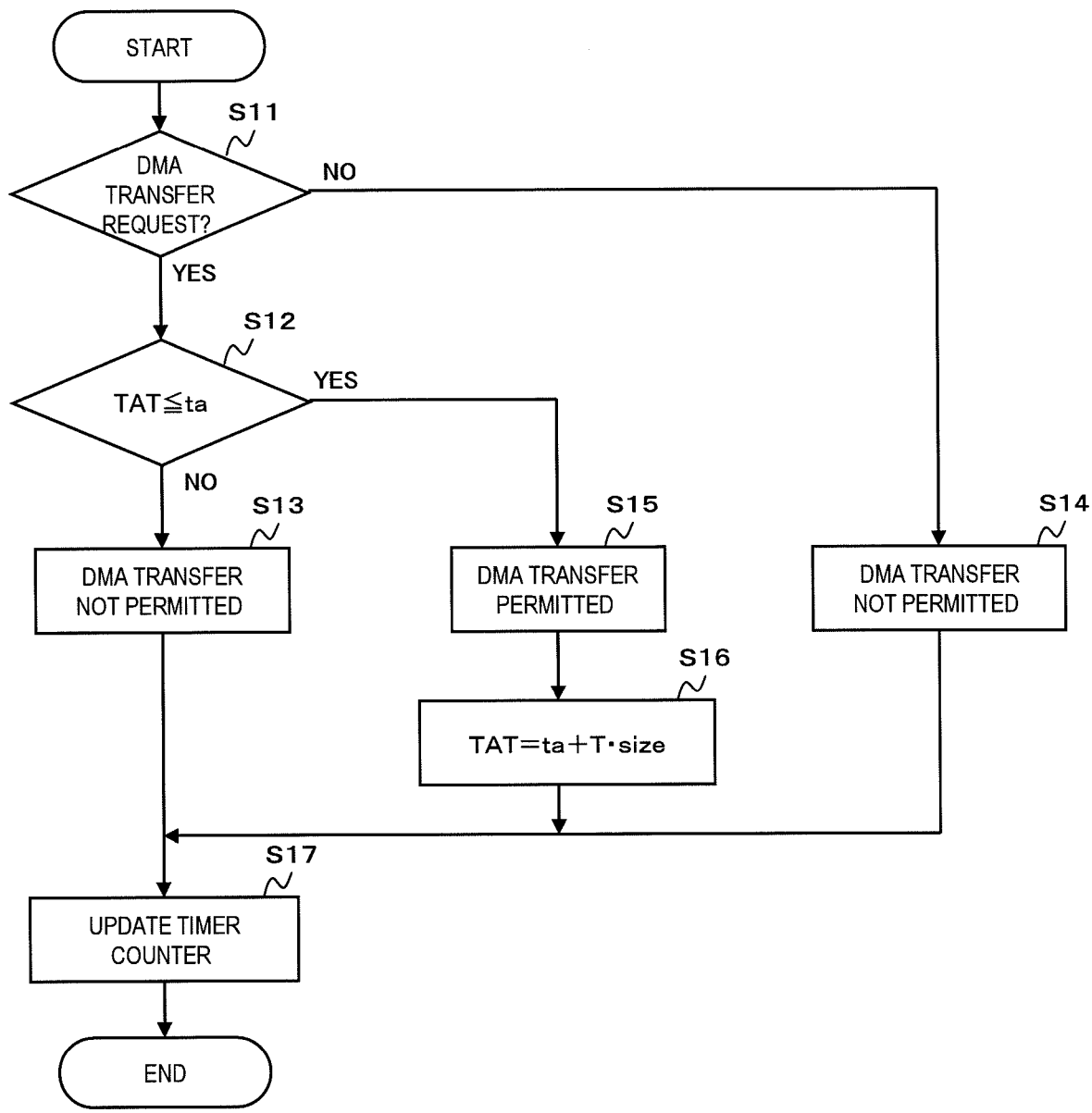
FIG. 3 is a flowchart showing the operation of a DMA transfer control device relating to the first example of the present invention.

Next, the operation of the DMA transfer control device will be described. FIG. 3 is a flowchart showing the operation of the DMA transfer control device relating to the first example of the present invention. The operation of the circuit that issues the DMA transfer permission based on the peak DMA transfer rate within the DMA controller circuits 27 to 29 shown in FIG. 2 will be described.

When a DMA transfer request is received (YES in step S11), the following judgment is made using the DMA transfer scheduled time TAT, the DMA transfer interval for unit DMA transfer size T, and the DMA transfer size "size" read respectively from the registers 19, 14, and 15, and the judgment time ta read from the timer counter 13.

When TAT≦ta (YES in step S12), it is determined that the peak DMA transfer rate is not exceeded, and DMA transfer is permitted (OK) (step S15). Then TAT=ta+T·size is set as the next DMA transfer scheduled time TAT (step S16).

When TAT>ta (NO in the step S12), it is determined that the peak DMA transfer rate is exceeded, and DMA transfer is not permitted (wait) (step S13). At this time, the DMA transfer scheduled time TAT is not updated.

Further, DMA transfer is also not permitted (step S14) and the DMA transfer scheduled time TAT is not updated when no DMA transfer request is received (NO in the step S11).

In any case, the timer counter 13 is updated so that the judgment time ta becomes ta=ta+1 (step S17).

The DMA transfer control device dynamically controls DMA transfer by sending "DMA Transfer Permitted (OK)" or "Not Permitted (wait or no DMA transfer request)" to the DMA arbiter 23 according to what is determined.

Figure 4:
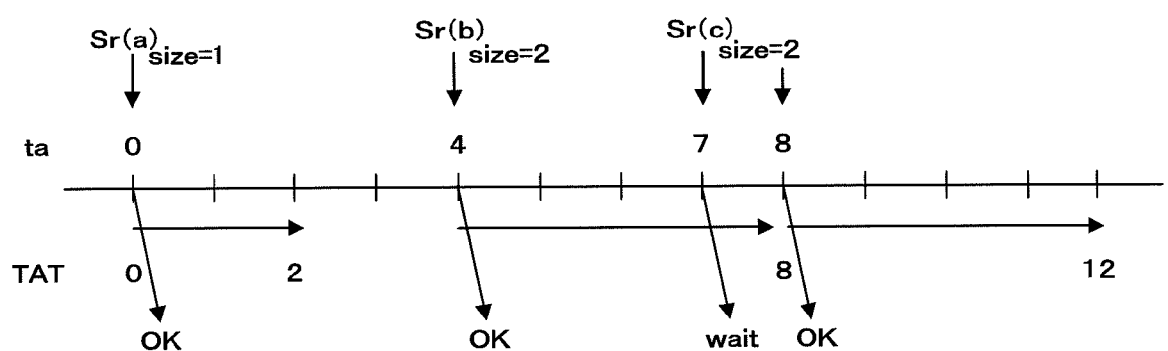
FIG. 4 is a timing chart showing the operation of the DMA transfer control device relating to the first example of the present invention.

FIG. 4 is a timing chart showing the operation of the DMA transfer control device relating to the first example of the present invention.

First, we will assume that TAT=0, ta=0, T=2, and size=1 when a DMA transfer request signal Sr (a) is received. Here, since TAT (0)≦ta (0) holds, DMA transfer is permitted (OK), and the next DMA transfer scheduled time TAT is updated to TAT=0+2×1=2.

When a DMA transfer request signal Sr (b) is received, the following holds: TAT=2, ta=4, T=2, and size=2. Since TAT (2)≦ta (4) holds, DMA transfer is permitted (OK), and the next DMA transfer scheduled time TAT is updated to TAT=4+2×=8.

When a DMA transfer request signal Sr (c) is received, the following holds: TAT=8, ta=7, T=2, and size=2 . Since TAT (8)>ta (7) holds, DMA transfer is suspended (wait). Here, the DMA transfer scheduled time is not updated.

At the next time point, the DMA transfer request signal Sr (c) is similarly re-examined. At this time, TAT=8, ta=8, T=2, and size=2 . Since TAT (8)≦ta (8) holds, DMA transfer is permitted (OK), and the next DMA transfer scheduled time TAT is updated to TAT=8+2×2=12.

In the DMA transfer control device that operates as described above, DMA transfer is suspended (wait) until the DMA transfer scheduled time corresponding to the peak DMA transfer rate even if there is a DMA transfer request. As a result, DMA transfer can be dynamically controlled so that a predetermined DMA transfer rate is not exceeded even when the number of DMA transfer requests temporarily increases.

The each disclosure of the above-mentioned Patent Documents is incorporated herein by reference thereto. It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A Direct Memory Access (DMA) transfer control device, comprising:
   a DMA arbiter that performs DMA transfer for each DMA channel formed by a combination of a memory and a plurality of input/output devices; and
   a DMA controller circuit that controls the DMA arbiter;
   a judgment unit that sends a DMA transfer permission to said DMA arbiter in a case where a judgment time at which a DMA transfer request arrives from said input/output device is not earlier than a DMA transfer scheduled time;
   a timer counter that times said judgment time at a unit time interval; and
   a comparator that compares said judgment time at which said DMA transfer request arrives with said DMA transfer scheduled time; wherein
   said judgment unit sends the DMA transfer permission to said DMA arbiter when an output of said comparator indicates that said judgment time is not earlier than said DMA transfer scheduled time and does not send the DMA transfer permission to said DMA arbiter when the output of said comparator indicates that said judgment time is earlier than said DMA transfer scheduled time; and
   a transfer time calculation unit that calculates a next round of said DMA transfer scheduled time based on a DMA transfer size for said DMA transfer request and said judgment time.

2. A Direct Memory Access (DMA) transfer control device, comprising:
   a DMA arbiter that performs DMA transfer for each DMA channel formed by a combination of a memory and a plurality of input/output devices; and
   a DMA controller circuit that controls the DMA arbiter;
   a judgment unit that sends a DMA transfer permission to said DMA arbiter in a case where a judgment time at which a DMA transfer request arrives from said input/output device is not earlier than a DMA transfer scheduled time; and
   a transfer time calculation unit that calculates a next round of said DMA transfer scheduled time based on a DMA transfer size for said DMA transfer request and said judgment time,
   wherein
   said transfer time calculation unit comprises a calculation unit that multiplies a set value of a DMA transfer size for said DMA transfer request by a set value of a DMA transfer interval for unit DMA transfer size to create a multiplication result, and that adds said judgment time to the multiplication result; and
   a register that holds the calculation result of said calculation unit as a next round of said DMA transfer scheduled time.

3. A system comprising:
   a direct memory access (DMA) arbiter configured to perform a DMA transfer in response to a DMA transfer request from an input/output device;
   a calculation unit configured to calculate a DMA transfer scheduled time based on a multiplication result of a DMA transfer size of the DMA transfer request and a DMA transfer interval for a unit DMA transfer size when, the DMA transfer request is permitted; and
   a judgment unit coupled between the input/output device and the DMA arbiter to reject another DMA transfer request from the input/output device when the another DMA transfer request arrives earlier than a DMA transfer scheduled time.

* * * * *

UNITED STATES PATENT AND TRADEMARK OFFICE
CERTIFICATE OF CORRECTION

PATENT NO. : 8,285,889 B2  
APPLICATION NO. : 12/789741  
DATED : October 9, 2012  
INVENTOR(S) : Naoko Shinohara Page 1 of 1

It is certified that error appears in the above-identified patent and that said Letters Patent is hereby corrected as shown below:

In the Specification

Column 3, Line 57: delete "adder" and insert -- adder 17 --

Column 4, Line 49: delete "TAT=4+2×=8." and insert -- TAT=4+2×2=8. --

Signed and Sealed this  
Sixth Day of May, 2014

Michelle K. Lee  
*Deputy Director of the United States Patent and Trademark Office*